(12) United States Patent
Buergermeister et al.

(10) Patent No.: US 8,919,532 B2
(45) Date of Patent: Dec. 30, 2014

(54) MODULAR DELIVERY SYSTEM

(71) Applicant: ASKION GmbH, Gera (DE)

(72) Inventors: Daniel Buergermeister, Zwickau (DE); Andreas Kaestner, Burkersdorf (DE)

(73) Assignee: ASKION GmbH, Gera (DE)

( * ) Notice: Subject to any disclaimer, the term of this patent is extended or adjusted under 35 U.S.C. 154(b) by 0 days.

(21) Appl. No.: 13/901,846

(22) Filed: May 24, 2013

(65) Prior Publication Data

US 2013/0313074 A1 Nov. 28, 2013

(30) Foreign Application Priority Data

May 25, 2012 (DE) .......................... 10 2012 104 539

(51) Int. Cl.
*B65G 47/84* (2006.01)
*B65G 35/06* (2006.01)
*B61B 5/00* (2006.01)
*B61B 13/04* (2006.01)

(52) U.S. Cl.
CPC . *B65G 35/06* (2013.01); *B61B 5/00* (2013.01); *B61B 13/04* (2013.01); *Y02T 30/40* (2013.01)
USPC .................................................. 198/465.1

(58) Field of Classification Search
USPC ................ 198/345.1, 345, 2, 3, 346.1, 465.1
See application file for complete search history.

(56) References Cited

U.S. PATENT DOCUMENTS

| | | | | |
|---|---|---|---|---|
| 4,805,759 | A * | 2/1989 | Rochet et al. | 198/346.1 |
| 5,062,368 | A * | 11/1991 | Sticht et al. | 104/172.3 |
| 5,709,375 | A * | 1/1998 | Klopfenstein | 270/52.26 |
| 6,308,818 | B1 | 10/2001 | Bonora et al. | |
| 6,481,558 | B1 * | 11/2002 | Bonora et al. | 198/346.2 |
| 8,205,558 | B2 | 6/2012 | Horn et al. | |
| 8,347,789 | B2 | 1/2013 | Wolf et al. | |
| 8,397,896 | B2 * | 3/2013 | Kleinikkink et al. | 198/345.3 |
| 2009/0013897 | A1 | 1/2009 | Horn et al. | |
| 2009/0013899 | A1 | 1/2009 | Wolf et al. | |

FOREIGN PATENT DOCUMENTS

| | | |
|---|---|---|
| AU | 608089 B2 | 11/1989 |
| DE | 102006049588 A1 | 8/2007 |
| DE | 112008001754 T5 | 1/2009 |
| DE | 102008032151 A1 | 1/2010 |

* cited by examiner

*Primary Examiner* — William R Harp
(74) *Attorney, Agent, or Firm* — Abel Law Group, LLP (57) ABSTRACT

Disclosed is a modular delivery system that includes a guide rail (1) with which is associated at least one delivery station (6) for delivering an object to an end position (5), and a trolley (2) which is movable along the guide rail (1) for transporting an object. A delivery position (4) of the trolley (2) is determined by each associated delivery station (6), and the trolley (2) is repeatedly deliverable to at least one of the delivery positions (4). The trolley (2) has a delivery table (3) which can be placed on and removed from the trolley (2) horizontally, and the delivery table (3) is transferable from every delivery position (4) to the associated end position (5) and from every end position (5) to the associated delivery position (4).

19 Claims, 9 Drawing Sheets

MODULAR DELIVERY SYSTEM

CROSS-REFERENCE TO RELATED APPLICATIONS

The present application claims priority under 35 U.S.C. 119 of German Patent Application No. 10 2012 104 539.9, filed May 25, 2012, the entire disclosure of which is expressly incorporated by reference herein.

BACKGROUND OF THE INVENTION

1. Field of the Invention

The invention is directed to a modular delivery system for the delivery of objects to at least one end position using a rail system such as is known generically from U.S. Pat. No. 6,308,818 B1, the entire disclosure of which is incorporated by reference herein.

2. Discussion of Background Information

Delivery systems are known, for example, for use in the production, assembly or packaging of products or in the warehousing of objects such as, e.g., tools, consumables or merchandise.

It is particularly convenient when the delivery system is formed modularly so that the delivery system can be easily adapted to different local conditions, workload capacities and other varied requirements.

A modular delivery system which includes at least one guide rail and trolleys which are movable along the guide rail is known from U.S. Pat. No. 6,308,818 B1. Each trolley is deliverable to at least one delivery position of the guide rail. Proceeding from the delivery position, the entire trolley is deliverable to a work place (hereinafter referred to as end position) in that it is removed from the guide rail and transported via a delivery station to the end position. At the end position, the objects to be transported can be loaded on the trolley or transported objects can be unloaded from the trolley. The modular delivery system is adapted to diverse spatial conditions by means of standardized, modularly disposable guide rail sections, shunts and curves. The trolley is driven by a system of wheels which are drivable in a controlled manner and are integrated in one of the guide rails.

The described delivery system is disadvantageous in that a trolley must remain at the end position during loading and unloading and is not available for other purposes. The modular delivery system disclosed in U.S. Pat. No. 6,308,818 B1 is also not suitable for transporting or delivering cooled, especially deep-frozen, samples, e.g., for medical purposes, because there is no assurance that the cold chain will be maintained.

It is the object of the invention to suggest a modular delivery system which has improved flexibility over the prior art with respect to the availability of the trolleys and can deliver a wider assortment of objects.

SUMMARY OF THE INVENTION

The present invention provides a modular delivery system which includes a guide rail, with which is associated at least one delivery station for delivering an object to an end position, and a trolley which is movable along the guide rail for transporting an object. A delivery position of the trolley is determined by each associated delivery station, and the trolley is repeatedly deliverable to at least one of the delivery positions. In a modular delivery system according to the invention the trolley has a delivery table which can be placed on and removed from the trolley horizontally, and the delivery table is transferable from every delivery position to the associated end position and from every end position to the associated delivery position.

The guide rail can comprise one or more individual rails, and a plurality of individual rails may be variously configured. Preferably only one guide rail formed by an individual rail is provided. The length and the actual path of the guide rail can be adapted to the respective place of use and purpose of use. The guide rail preferably comprises individual portions which can be variously shaped, e.g., as curves of different radii, and joined together as needed. Different rooms, floors and buildings as well as different equipment and work places can be interconnected by the guide rail. Complex systems of guide rails, e.g., with loops, cross-connections with shunts, or different vertical movement planes, can also be formed by the guide rail.

A delivery position may be any location along the guide rail to which a trolley is deliverable. An advantage of the modular delivery system according to the invention is that at least one delivery station can be arranged adjacent to the guide rail in accordance with an actual need and while taking into account the spatial conditions. Due to the freely selectable positioning of the delivery station adjacent to the guide rail, the delivery position of this delivery station is fixed. A trolley must be delivered to the delivery position in order to transfer the delivery table to the end position or to allow receipt of the delivery table from the end position. The delivery station is preferably oriented perpendicular to the guide rail. In further embodiments of the modular delivery system according to the invention, however, the delivery station can also be arranged at an angle other than 90°.

The trolley is preferably pulled under or pushed under the delivery table horizontally, and the delivery table is preferably pushed onto or pulled onto the trolley horizontally. The delivery table can also be displaced by a sequence of pushing and pulling motions. The delivery table is preferably placed on (received by) the trolley in such a way that it can be removed from, for example, pulled off, the trolley perpendicular to the guide rail, and an arrangement at an angle other than 90° can be implemented.

The delivery station has at least one delivery path for guiding the delivery table and a transporting belt which can be driven in a controlled manner and which has at least one driver for displacing the delivery table along the delivery path. For this purpose, at least one of the drivers is movable against a first stop of the delivery table and at least one driver is movable against a second stop of the delivery table. The delivery table is displaceable in delivery direction by means of a driver which is moved against the first stop or second stop. In a preferred embodiment of the delivery table, the delivery table has a first stop and a second stop, respectively, at its front and rear end in delivery direction.

In a simple embodiment, the transporting belt is constructed as a revolving belt. In further embodiments, it can also be formed, for example, as a finite belt, a chain, cable haulage, or other conveying system.

The end position is formed by a region of the delivery station. The end position is a position of the delivery table at which an object can be deposited on the delivery table or removed therefrom. An object of this kind can be, for example, a thermally insulated receptacle, preferably a receptacle which is insulated against heat loss. By objects is meant within the meaning of the application any article which can be deposited on the delivery table and transported by this delivery table. Objects may be put together, e.g., a receptacle with a lid, or freely combined with each other, e.g., specimen vessels, workpieces or semifinished products which can be placed into, plugged into or suspended in a receptacle. End positions are also positions of the delivery table at which further objects, e.g., specimen vessels, can be added to or removed from objects that can be deposited on the delivery table. Various apparatus such as, for example, specimen holders, test instruments or apparatus for processing the samples (e.g., sequencers, PCR devices) can be provided at the end positions. The end position is preferably a portion of the delivery path.

The trolley can have its own drive system, e.g., an electric drive. It can also be driven by a drive system which is arranged outside the trolley, e.g., which is integrated in the guide rail as is known from the art.

In an advantageous embodiment of the delivery system according to the invention, the trolley has a locking element for locking the delivery table to the trolley. The delivery table is securely held to the trolley by locking, particularly during traveling movements of the trolley.

In further embodiments of the modular delivery system according to the invention, the locking element can be arranged at the delivery table or at the delivery table and trolley.

The locking element can be configured as a Maltese cross which is rotatable around its center axis and has four opposed arms and four opposed slots. Two opposed arms of the Maltese cross are preferably longer in radial direction than the two other arms such that the two opposed longer arms are formed so as to extend beyond the other arms by a projecting length in radial direction.

Further, at least two switching elements can be provided for switching the Maltese cross. A first switching element can be formed as a pin. The pin is so arranged that it engages in one of the slots of the Maltese cross with each passage of the trolley. The Maltese cross is compulsorily switched by the first switching element with each passage in that it is rotated by one quarter of a revolution. The switching elements are preferably associated with the delivery station and can be arranged therewith along the guide rail.

The second switching element, on the other hand, is formed as an element against which one of the projecting lengths can move during a traveling movement of the trolley so as to cause a rotation of the Maltese cross by one quarter of a revolution. The Maltese cross is only switched by the second switching element when one of the longer arms is so aligned that its projecting length is oriented so as to be movable against the second switching element. The second switching element is positioned in such a way that when the short arms are oriented vertically the Maltese cross is guided past the second switching element without contacting it. On the other hand, if the projecting lengths are vertically oriented, one of these projecting lengths makes contact with the second switching element when the trolley moves past the second switching element.

The second switching element can also be, for example, a pin, a horizontally oriented plate or a plurality of pins or pegs arranged adjacently at one height. The Maltese cross is prevented from rotating by more than one quarter revolution by a plate or by adjacently arranged pins or pegs.

The first switching element and second switching element are preferably arranged in such a way that the trolley passes the two switching elements before reaching the delivery position. In so doing, it is preferable that the first switching element and then the second switching element are arranged one after the other in the direction of the traveling movement of the trolley. The second switching element can also be arranged in the delivery position, and the associated switching process must be concluded when the trolley has reached the delivery position.

The modified Maltese cross and the first switching element and second switching element form a Maltese cross drive by means of which it is ensured that the delivery table always reaches the delivery position in an unlocked condition regardless of whether the delivery table was previously in locked condition or unlocked condition. Incorrect locking conditions can also be corrected in this way.

It is extremely advantageous when an arrangement of a first switching element and a second switching element is followed in turn by a second switching element and another first switching element. In so doing, a first switching element and a second switching element is arranged on each side of the delivery position, and the second switching element is arranged closer to the delivery position than the first switching element in each instance. As a result of this kind of arrangement of a total of four switching elements, a trolley can be delivered to the delivery position from different directions. Accordingly, the delivery position can be set midway in the guide rail, for example. The trolley can be delivered to this delivery position from both sides so that the times for a delivery can be kept short and the existing trolleys can be used efficiently. By means of the arrangement of four switching elements, the trolley always reaches the delivery position in the unlocked condition and is always in the locked condition after passing the arrangement of switching elements, that is, regardless of whether it was previously locked or unlocked. By locked condition is meant that the long arms are oriented vertically. If the delivery table is present on the trolley, the locking element prevents this delivery table from being removed from the trolley. Correspondingly, an unlocked condition exists when the short arms are oriented vertically.

However, the switching of the locking element is also carried out when the locking element is arranged at the trolley and the trolley is moved without delivery table.

The delivery table can have movement elements such as, e.g., wheels, rollers or rolls on which the delivery table rolls on the delivery path. In an advantageous embodiment, the arrangement of the movement elements is selected in such a way that an assembly-dependent gap which may possibly be present between the trolley and the delivery path can be bridged without tilting the trolley out of a specified, e.g., horizontal, position. Accordingly, at least three movement elements can be provided at the delivery table and their mutual distances with respect to one another are selected in such a way that the center of mass of the delivery table preferably lies over the axis of the middle movement element, and the distances between the axis of the middle movement element and the respective axes of the other movement elements are greater than the gap. Arranging the movement elements in this way ensures that the delivery table will always stand on at least two movement elements and prevents a tilting of the delivery table. In a preferred embodiment of the delivery table, the delivery table has four wheels as movement elements on two of its sides in each instance. The gap which may be present must be bridged when the delivery table is delivered to the end position from a trolley located at the delivery position and when delivered from the end position back to the trolley. The described arrangement of the movement elements makes it possible to allow gaps of different widths during assembly of the modular delivery system. This facilitates the use of standardized parts of the delivery path without requiring exactly fitting connections between guide rails, trolley and delivery path by time-consuming adjustment and custom fabrication, so that a greater flexibility of the modular delivery system is achieved.

In a further embodiment of the delivery system according to the invention, the delivery path is spanned by a portal. By portal is meant, in a simple case, a frame spanning the delivery path. The delivery table can be guided through beneath the portal. The portal is displaceable along an expanse in delivery direction and is simultaneously vertically adjustable. The expanse is preferably defined by two positions to which the portal can be advanced. In a preferred embodiment of the portal, the portal is displaceably bearing-mounted on both sides of the delivery path on an inclined plane. If the inclined plane is configured so as to ascend in a straight line, the portal is variable in height by a constant amount for each section of expanse. In this case, there is a linear relationship between the expanse traveled and the height surmounted. In further embodiments, the relationship can also be different, for example, sigmoidal, exponential or otherwise nonlinear. The height range is defined by the minimum and maximum possible height of the portal. The length of the expanse and the type of relationship between expanse and surmounted height is preferably selected in such a way that a desired height range can be surmounted.

In an embodiment which is advantageous because it makes do without an additional drive, the portal is positively guided along the expanse by the delivery table. In so doing, the driving power transmitted to the delivery table by the transporting belt is also used to displace the portal.

For this purpose, the delivery table can have at least one cam and the portal can have at least one slotted link, the cam and slotted link being configured and arranged in such a way that the cam engages in the slotted link at the start of the expanse and exits the slotted link at the end of the expanse. When the cam exits the slotted link, the delivery table is movable forward under the portal and a free access to the delivery table and any object transported thereon is ensured. The transmission of force from the delivery table to the portal takes place from the cam to the slotted link. A plurality of cams and slotted links can be provided for a more uniform and a symmetrical transmission of force. The expanse can additionally be limited by stops of the portal which prevent an overshooting of the expanse. Means for holding the portal, e.g., magnets or a catch mechanism between portal and stop, can be provided at the higher end of the expanse.

In an advantageous manner, an object or part of an object located on the trolley can be lifted or lowered by the portal, while the trolley travels over the expanse. At least one lifting element can be arranged at the portal for engaging in a receiving region of an object transported by the delivery table. The object can be a lid of a receptacle, for example. The lifting element is advantageously constructed in such a way that it engages in the receiving region during a traveling movement of the delivery table in direction of the end position, and the object to be lifted remains held by the lifting element at the end of the expanse. Due to the fact that the delivery table is moved under the portal again, the lid, for example, remains at the portal while access to the interior of the receptacle is enabled at the end position. The lifting element is preferably provided and used to uncover a receptacle which is transported on the delivery table and which is provided with a lid.

The orientation of the object on the delivery table can be ensured by positive engaging guides. For example, the object can have an asymmetrical bottom surface and the delivery table can have corresponding means for receiving the latter. An asymmetrical projection which is shaped so as to engage in a guide of the delivery table can also be provided at the object.

During a subsequent traveling movement away from the end position, the object to be lifted is lowered by a renewed displacement of the portal by means of the delivery table. At the end of the expanse, the lifting element exits again from the receiving region and the object to be lifted is released again, e.g., the lid is placed on the receptacle again and the latter is closed.

The delivery table can also be halted on the delivery path, particularly at the end position. In the meantime, the trolley can be advanced to other delivery positions. If there is a plurality of trolleys, the delivery table can be transferred to the delivery position on one of the other trolleys.

It has proven expedient when the drive of the transporting belt has a torque sensor, for example, to press the delivery table with static force against a fixed end stop or to prevent consequential damage in the event of malfunctions or technical defects by means of an intentional emergency stop.

A torque sensor of this kind can be formed by an element which is mounted so as to be rotatable when a torque threshold is exceeded. The rotatably mounted element can be a motor for driving the transporting belt. The element can communicate with proximity switches by which a switching signal is emitted when the torque threshold is exceeded and a rotation of the element takes place subsequently, this signal being processed as befits the purpose by means of the control.

The rotation of the element is initially prevented, for example, by pre-loaded spring elements, and does not take place until a limiting torque is exceeded. The arrangement can also be implemented in a plurality of steps in order, for example, to detect an operation-dependent limiting torque and an overload torque.

Further, a control can be provided by means of which the modular delivery system can be controlled so that a delivery table is deliverable to at least one end position and at least one trolley, and a trolley is deliverable to at least one delivery position. If there is a plurality of trolleys, delivery tables, delivery positions and end positions, complex delivery sequences can also be controlled by means of the control. The speeds of the trolley and delivery table are possibly variable. Accordingly, longer portions of the guide rails or delivery path can be covered at higher speeds, while lower speeds can be reached when approaching delivery positions or end positions.

For this purpose, it is advantageous when every trolley and/or every delivery table has a locator element allowing the location of the trolley and/or delivery table to be determined Apart from simply determining location, specific data for the trolley and/or delivery table can also be retrievably stored in the locator elements. Locator elements of this kind can operate, for example, in a noncontacting manner, e.g., like inductively excited passive transmitters (e.g., transponders) or barcodes. They can also be configured in such a way that a direct contact is required for reading data and for changing data. Data can be written to the locator elements as is well known from the prior art. Suitable reading devices, e.g., transponder reading devices or barcode scanners, are provided depending on the selected locator elements.

The control is preferably signal-connected to a database for managing complex sequences.

Due to the ability to remove and replace a lid, the modular delivery system according to the invention is particularly suitable for delivery of cooled and frozen samples. For example, medical, biochemical or chemical samples can be delivered to a plurality of end positions. Further, the samples can also be processed, exchanged or simply removed at the end positions. The delivery table is deliverable to the respective end positions depending on the sample currently placed on or in an object and on the need for the sample at different end positions. Due to a defined orientation of the object, the position of samples provided in the object is also unambiguously defined at all times so that safe removal and insertion can be carried out without errors. Further, reading devices for sensing marks on the samples, e.g., applied barcodes, can be provided for verifying the identity of a sample that has been removed or is to be inserted.

Serums, DNA, tissue and microcultures are some examples of samples.

BRIEF DESCRIPTION OF THE DRAWINGS

The invention will be described more fully in the following with reference to embodiment examples and drawings. The drawings show.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
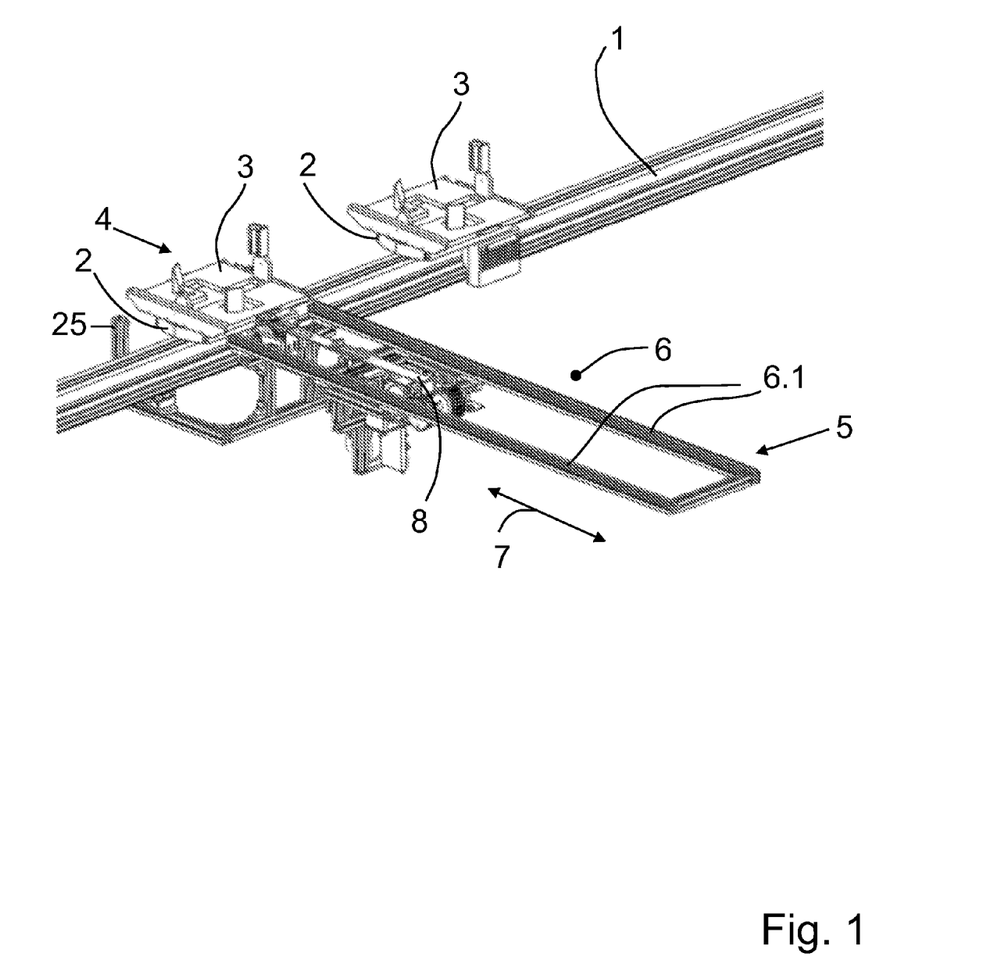
FIG. 1 a first embodiment of a modular delivery system according to the invention with delivery path and trolleys with delivery table in a delivery position.

FIG. 1 shows a guide rail 1, two trolleys 2, each with a delivery table 3, and a delivery station 6 as key components of a modular delivery system according to the invention.

The trolleys 2, together with the delivery tables 3 provided on the trolleys 2, are movable along the guide rail 1 and deliverable to a delivery position 4. The delivery station 6 is associated with the delivery position 4 in such a way that a delivery table 3 can be removed horizontally in a delivery direction 7 from the trolley 2 located in delivery position 4 and can be moved along a delivery path 6.1 to an end position 5. The movement of the delivery table 3 in the delivery direction 7 is made possible by a transporting belt 8 which is driven in a controlled manner.

The trolley 2 is outfitted with its own electric drive. The trolley 2 is supplied with power via the guide rail 1. Communication with the trolley 2 via IR link is possible. In further embodiments of the invention, the trolley 2 can also be connected to supply lines and control lines which are arranged at or integrated in the guide rail 1. It is also possible to control the trolley 2 by means of remote controls, particularly by radio remote control. Further, in another embodiment, a trolley 2 can also have its own energy supply in the form of batteries, storage cells and/or solar cells.

A mechanical drive is also possible, for example, by means of drive systems which are connected to or integrated in the guide rail 1, e.g., drivable wheels or rollers and combinations thereof.

Two columns 25 (only one of which is visible) are arranged at the delivery station 6 in such a way that they project upward on the side of the guide rail 1 remote of the delivery station 6 and on each side of the delivery position 4.

Figure 2:
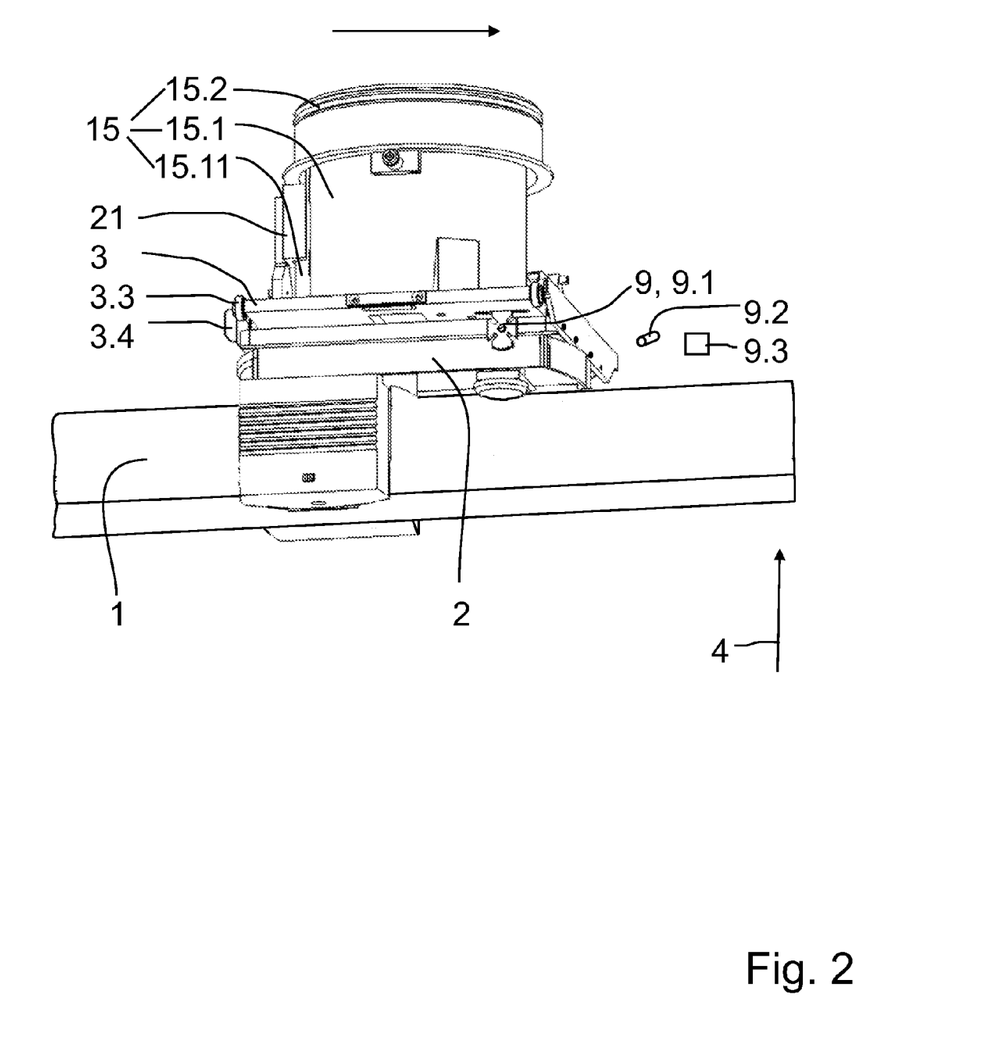
FIG. 2 a first embodiment of a Maltese cross drive according to the invention for locking a delivery table.

A locking device 9 by means of which the delivery table 3 can be locked to the trolley 2 is shown schematically in FIG. 2. The locking device 9 is formed by a Maltese cross 9.1 which is rotatably fastened to the trolley 2 and by a first switching element 9.2 and a second switching element 9.3 for switching the Maltese cross 9.1 by one quarter of a revolution in each instance. The Maltese cross 9.1 (likewise shown in FIG. 3 for clarity) has two opposing long arms 9.12 and two opposing short arms 9.13. The difference in length between the short arms 9.13 and the long arms 9.12 is referred to as projecting length 9.14 (see FIG. 3). The Maltese cross 9.1 is arranged at the trolley 2 in such a way that it is rotatable around its center axis (not shown), and a projecting length 9.14 of one of the long arms 9.12 in a position facing perpendicularly upward engages in each instance in a recess (shown schematically) at the underside of the delivery table 3. This prevents an unintentional displacement of the delivery table 3 from the trolley 2 in two directions transverse to the course of the guide rail 1. A displacement in direction of the guide rail 1 is prevented by means of edges 3.4 of the delivery table 3 which project out over the sides of the trolley 2 and by an orientation of wheels arranged as movement elements 3.3 at the delivery table 3.

A first switching element 9.2 and a second switching element 9.3 are provided adjacent to the guide rail 1. The first switching element 9.2 is formed as a pin which is dimensioned and positioned in such a way that, when the trolley 2 moves past, it always engages in the slot 9.11 opening approximately in direction of the first switching element 9.2. An arrow indicates the direction in which the trolley 2 moves past.

The second switching element 9.3 is formed as a horizontally oriented plate and is so positioned that only the long arms 9.12 can strike the second switching element 9.3 when the trolley 2 moves past. This happens only when the long arms 9.12 are oriented vertically. When the short arms 9.13 are oriented vertically, they can move past the second switching element 9.3 without contacting it.

FIG. 2 shows a trolley 2 moving toward a delivery position 4. The first switching element 9.2 is arranged in front of the delivery position 4 in the movement direction of the trolley 2. The second switching element 9.3 is arranged downstream thereof such that when the trolley 2 reaches the delivery position 4 a switching of the Maltese cross 9.1 caused by the second switching element 9.3 is terminated.

Because the trolley 2 can arrive at the delivery position 4 from two different directions, a second switching element 9.3 followed by a first switching element 9.2 (shown on only one side) are arranged on both sides of the delivery position 4. The first switching element 9.2 and second switching element 9.3 are each arranged adjacent to the guide rail 1 and are positioned and held by columns 25 (see FIG. 1) which are connected to the delivery station 6.

A vertical guide 21 by which an object 15 placed on the delivery table 3 is held in a predetermined orientation is arranged on the delivery table 3. The object 15 is a receptacle 15.1 with a fin 15.11 which is shaped so as to engage in the guide 21. A lid 15.2 placed on the receptacle 15.1 is not fixed with respect to its orientation by the fin 15.11.

When the trolley 2 is in a locked condition when reaching the first switching element 9.2, the Maltese cross 9.1 is switched by one quarter of a revolution by the engagement of the first switching element 9.2 in the slot 9.11, and one of the short arms 9.13 is moved into a vertically upwardly directed position. The trolley 2 is now in unlocked condition. When reaching the second switching element 9.3, the Maltese cross 9.1 is guided past the second switching element 9.3 without contacting it, so that the unlocked condition is maintained.

On the other hand, if the trolley 2 is in unlocked condition when reaching the first switching element 9.2, a locked condition is produced by the action of the first switching element 9.2. In so doing, one of the long arms 9.12 projects into the recess of the delivery table 3, while the opposite long arm 9.12 projects downward perpendicularly. When the second switching element 9.3 is reached, the downwardly projecting long arm 9.12 is moved against the second switching element 9.3 by its projecting length 9.14 causing the Maltese cross 9.1 to rotate by another quarter of a revolution as the trolley 2 continues to move and the unlocked condition is produced.

When the trolley 2 is moved away from the delivery position 4, one of the long arms 9.12 is always oriented vertically by means of the second switching element 9.3 and the first switching element 9.2.

Figure 3:
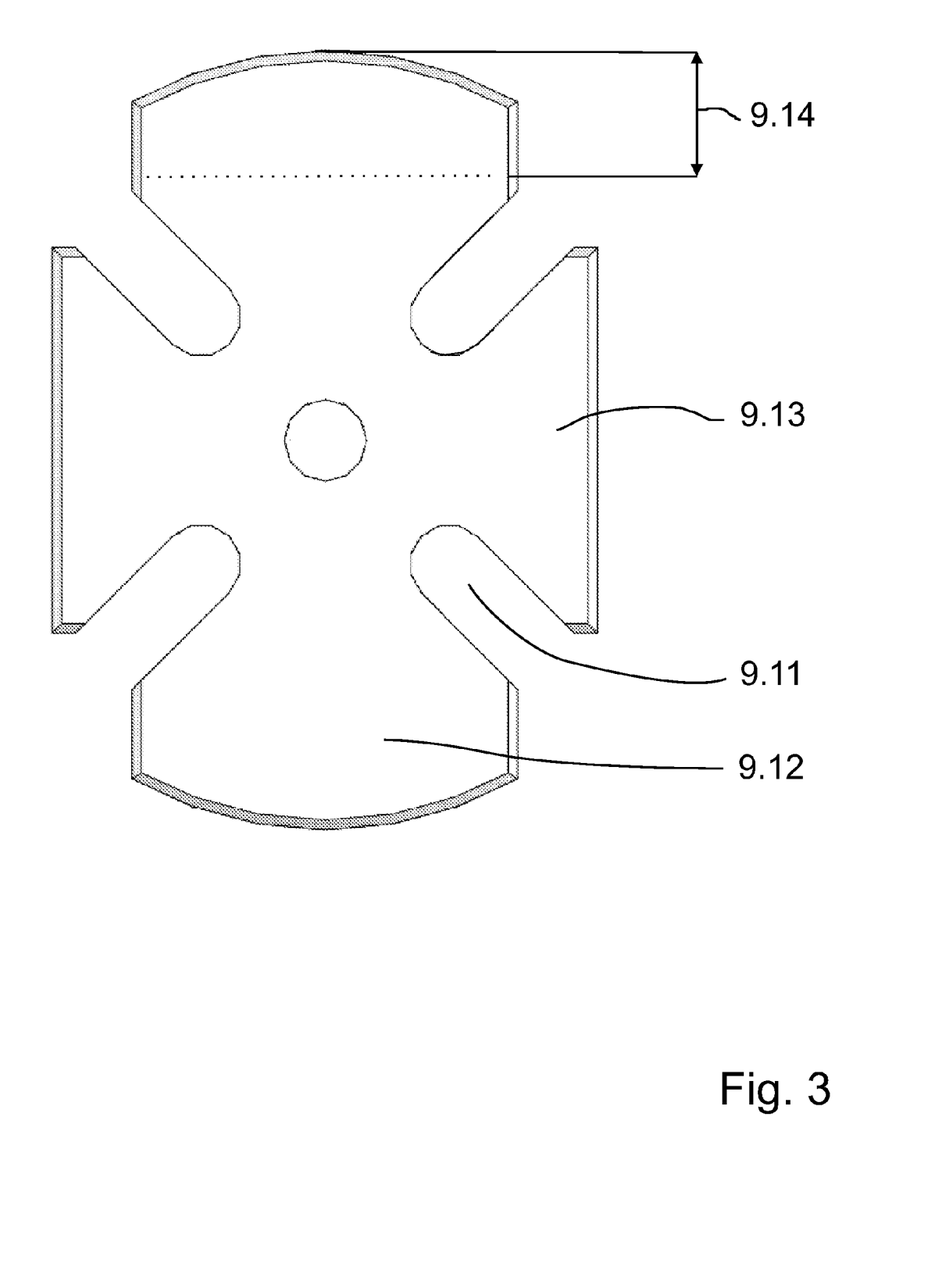
FIG. 3 a first embodiment of a Maltese cross according to the invention.

The Maltese cross 9.1 is shown more closely in FIG. 3. It has two opposing long arms 9.12 and two opposing short arms 9.13. The difference in length between the short arms 9.13 and the long arms 9.12 is illustrated as a projecting length 9.14 at one of the vertically directed long arms 9.12; the length of a short arm 9.13 is marked on the long arm 9.12 for illustrative purposes. There is a slot 9.11 between the arms 9.12, 9.13, respectively.

Figure 4:
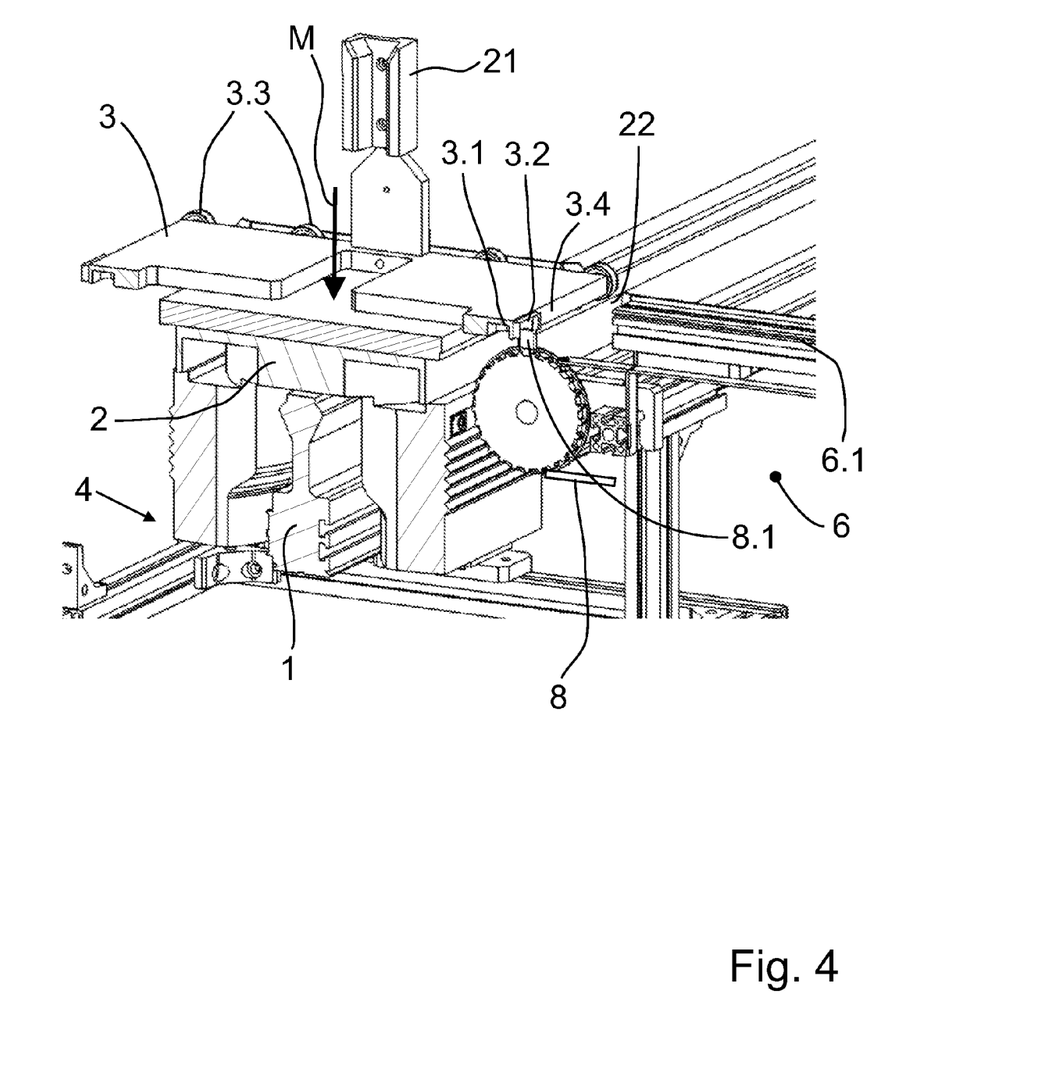
FIG. 4 in partial section a first embodiment of a modular delivery system according to the invention with a trolley at the delivery position.

A delivery path 6.1 of the delivery station 6 is shown in FIG. 4. The delivery path 6.1 is formed of two rails which are guided in parallel and between which the transporting belt 8 is arranged. FIG. 4 is a view in partial section medially through the trolley 2, delivery table 3 and guide rail 1 in which only one rail of the delivery path 6.1 is visible. There is a functional gap 22 between the delivery path 6.1 and the trolley 2 located in the delivery position 4. Two sets of four wheels are arranged as movement elements 3.3 at the delivery table 3 such that each axial distance between each movement element 3.3 is greater than the gap 22. A center of mass M (indicated by an arrow) of the delivery table 3, with or without object 15 (not shown), acts in a direction between the axes of the respective middle movement elements 3.3. At least at its end facing the gap 22, the delivery path 6.1 is at the same horizontal height as an upper surface of the trolley 2 so that the delivery table 3 is movable horizontally between delivery path 6.1 and trolley 2.

Provided at the transporting belt 8 (indicated schematically) are drivers 8.1 in the form of blocks which are fastened to the transporting belt 8 so as to protrude therefrom. To effect a movement of the delivery table 3 toward the end position 5 (see FIG. 1), the transporting belt 8 is driven and one of the drivers 8.1 is moved against a first stop 3.1 of the delivery table 3. The first stop 3.1 is formed by an inner side of the edge 3.4 at the side of the delivery table 3 which faces the end position 5. During a further movement of the transporting belt 8, the delivery table 3 is pulled from the trolley 2 onto the delivery path 6.1. When the delivery table 3 is pulled entirely onto the delivery path 6.1, the trolley 2 can move out of the delivery position 4. The delivery table 3 is displaced by the moving transporting belt 8 until the transporting belt 8 is stopped or the driver 8.1 is swiveled away by the first stop 3.1. This takes place when the transporting belt 8 reaches a pivot point and the driver 8.1 engaging between the rails of the delivery path 6.1 is guided away in downward direction. A further driver 8.1 is now moved against a second stop 3.2 on the side of the delivery table 3 remote of the end position 5 so that the delivery table 3 is pushed into the end position 5 (push-pull principle) by the continued movement of the transporting belt 8.

The delivery table 3 is advanced to a trolley 2 in the delivery position 4 in a similar manner in that the transporting belt 8 is driven in the reverse direction. The delivery table 3 has a first stop 3.1 and a second stop 3.2, respectively, at each of its edges 3.4 directed in delivery direction 7 (see FIG. 1).

Figure 5:
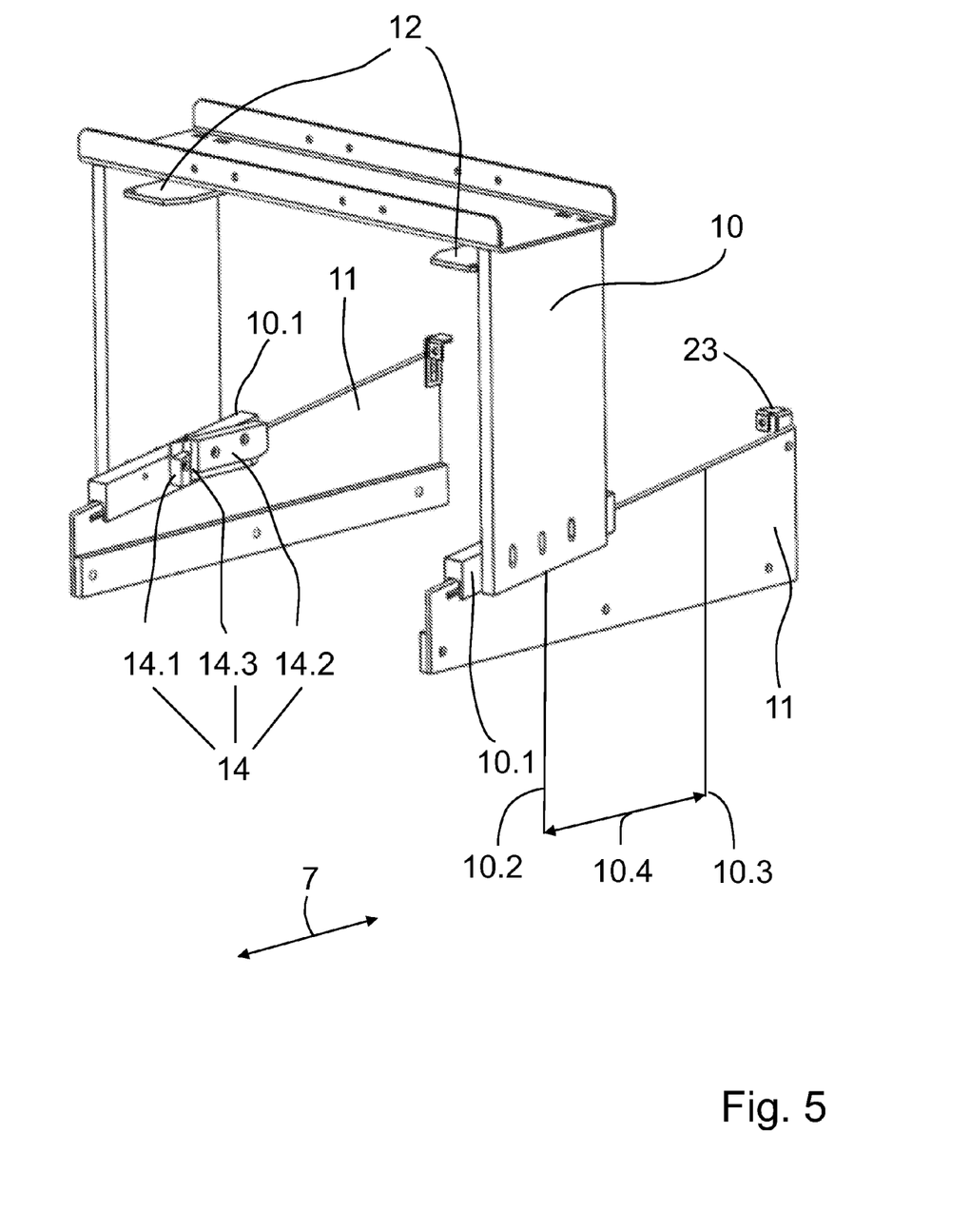
FIG. 5 an embodiment of a portal according to the invention in a first position.

In a second embodiment of the modular delivery system according to the invention shown in FIG. 5, a portal 10 is provided which spans the delivery path 6.1. For simplicity, the delivery path 6.1 (see FIGS. 1 and 4) is not shown. An inclined plane 11 which ascends in direction of the end position 5 (see FIG. 1) is arranged on both sides of the delivery path 6.1. The portal 10 is shaped as a U-shaped frame whose vertically directed side walls are connected in each instance to a sliding block 10.1. Each sliding block 10.1 sits on an inclined plane 11. The portal 10 is displaceable between a first position 10.2 at the lower end of the inclined plane 11 and a second position 10.3 at a higher end of the inclined plane 11 along an expanse 10.4 between the first position 10.2 and second position 10.3. During a displacement of the portal 10, the sliding block 10.1 slides along the inclined plane 11 so that the portal 10 is lifted or lowered by a height range 10.5 (see FIG. 6) depending on the delivery direction 7 that is taken.

A slotted link 14 is arranged at each sliding block 10.1 at the inner side of the portal 10. The slotted link 14 has a first member 14.1 and a second member 14.2 which are separated by a vertically extending groove 14.3 which is open on the side remote of the portal 10.

A lifting element 12 in the form of a horizontally oriented plate projecting perpendicularly from the inner wall is provided at each of the inner walls of the portal 10. The lifting elements 12 are aligned at the same height and parallel to one another. Blocking devices 23 provided at the inclined plane 11 limit a movement of the portal 10 along the inclined plane 11 and prevent overshooting of the second position 10.3.

In further embodiments of the delivery system, blocking devices 23 can also be provided at the first position 10.2. The blocking devices 23 can further be provided with magnets by means of which the portal 10 is held at the second position 10.3 to prevent it from sliding away.

Figure 6:
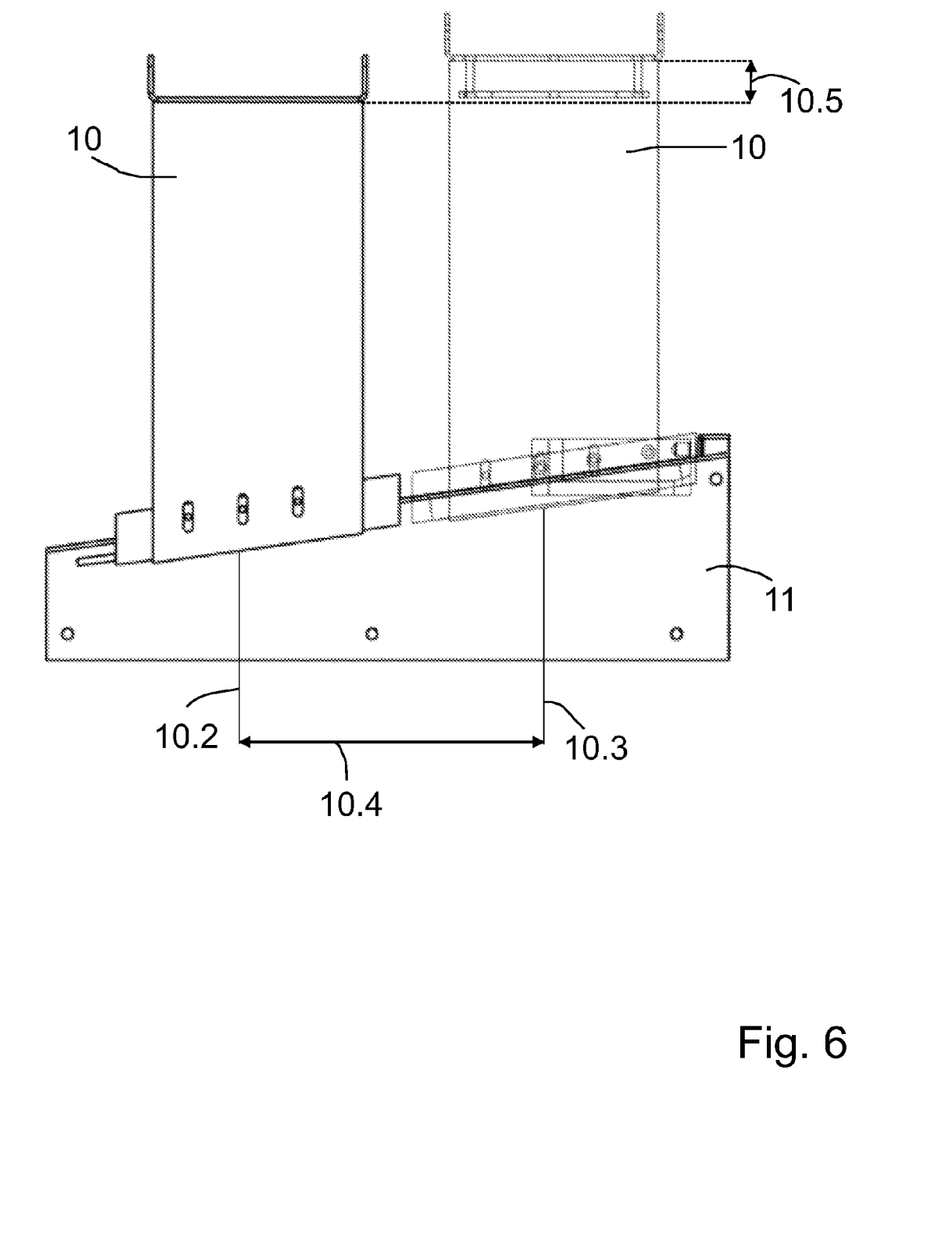
FIG. 6 a side view of the portal.

The second embodiment of the modular delivery system according to the invention from FIG. 5 is shown in FIG. 6 in a perspective view from the side. When the portal 10 is displaced by expanse 10.4 from the first position 10.2 into the second position 10.3, the portal 10 is raised by the amount of height range 10.5. The height range 10.5 corresponds to the elevation in the inclined plane 11 between the first position 10.2 and second position 10.3.

Figure 7:
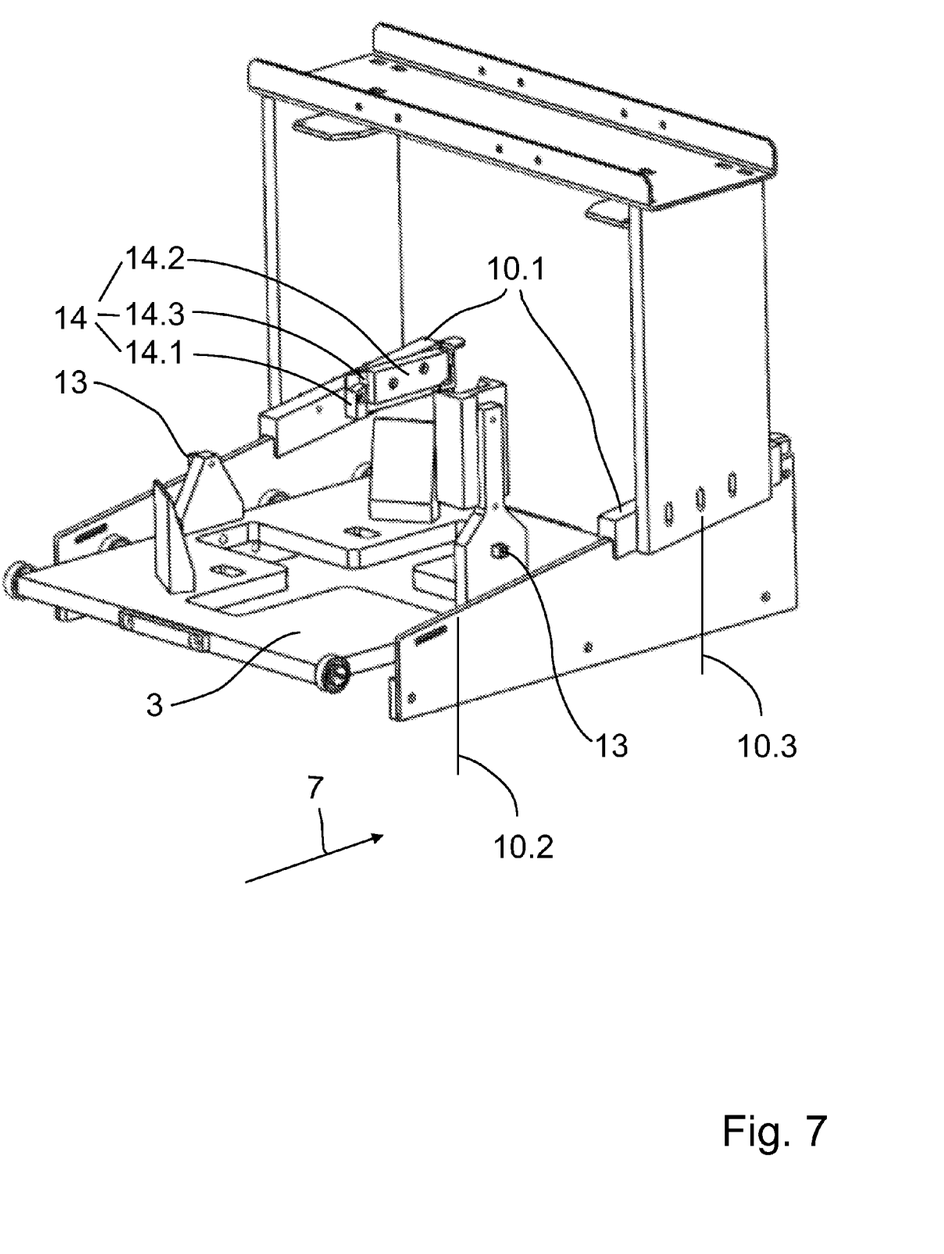
FIG. 7 a first embodiment of a modular delivery system according to the invention with portal, delivery table and slotted link.

The portal 10 is raised or lowered by the moving delivery table 3 in a positively controlled manner. As can be seen in FIG. 7, cams 13 are arranged on both sides of the delivery table 3 and are dimensioned and positioned in such a way that they enter into contact respectively with a slotted link 14 at each sliding block 10.1 during a displacement of the delivery table 3 in delivery direction 7.

To illustrate the process, an artificial situation has been chosen in which the delivery table 3 is shown approximately at the height of the first position 10.2 and the portal 10 is shown in the second position 10.3.

When the delivery table 3 is displaced in the illustrated delivery direction 7, each cam 13 contacts the slotted link 14 when the first position 10.2 is reached. In so doing, the cam 13 is moved over the first member 14.1 which is shorter on top in the vertical direction than the second member 14.2. The second member 14.2, on the other hand, is shorter on the bottom in vertical direction than the first member 14.1. By means of the cam 13, a force resulting from the movement of the delivery table 3 is transmitted to the second member 14.2 and, therefore, to the portal 10. The portal 10 is pushed in delivery direction 7 by the force. Due to the effect of the sliding block 10.1 sliding on top of the inclined plane 11, the portal 10 is steadily raised. Owing to the fact that the vertical position of the cams 13 does not change during this time, these cams 13 are guided through the groove 14.3 from top to bottom while the portal 10 is being raised. When the second position 10.3 is reached, the cams 13 also reach the end of the second member 14.2 that faces vertically downward and exit from the groove 14.3. The delivery table 3—and, along with it, the cams 13—is moved farther in delivery direction 7. In view of the fact that the cams 13 no longer transmit any force to the portal 10, the latter is not further displaced and remains at the second position 10.3.

During a movement of the delivery table 3 from the end position 5 to the delivery position 4 (neither of which is shown), each of the cams 13 passes the second member 14.2 and strikes a lateral surface of the first member 14.1 facing the groove 14.3. A force is transmitted into the first member 14.1 and, consequently, into the portal 10, and the portal 10 is displaced counter to the illustrated delivery direction 7. The cams 13 enter the respective grooves 14.3 and, as a result of the lowering of the portal 10, are guided through the groove 14.3 from the top to the bottom until the cams 13 exit the groove 14.3 at the first position 10.2 and are further displaced without contacting the slotted link 14. Therefore, the portal 10 remains at the first position 10.2.

Figure 8:
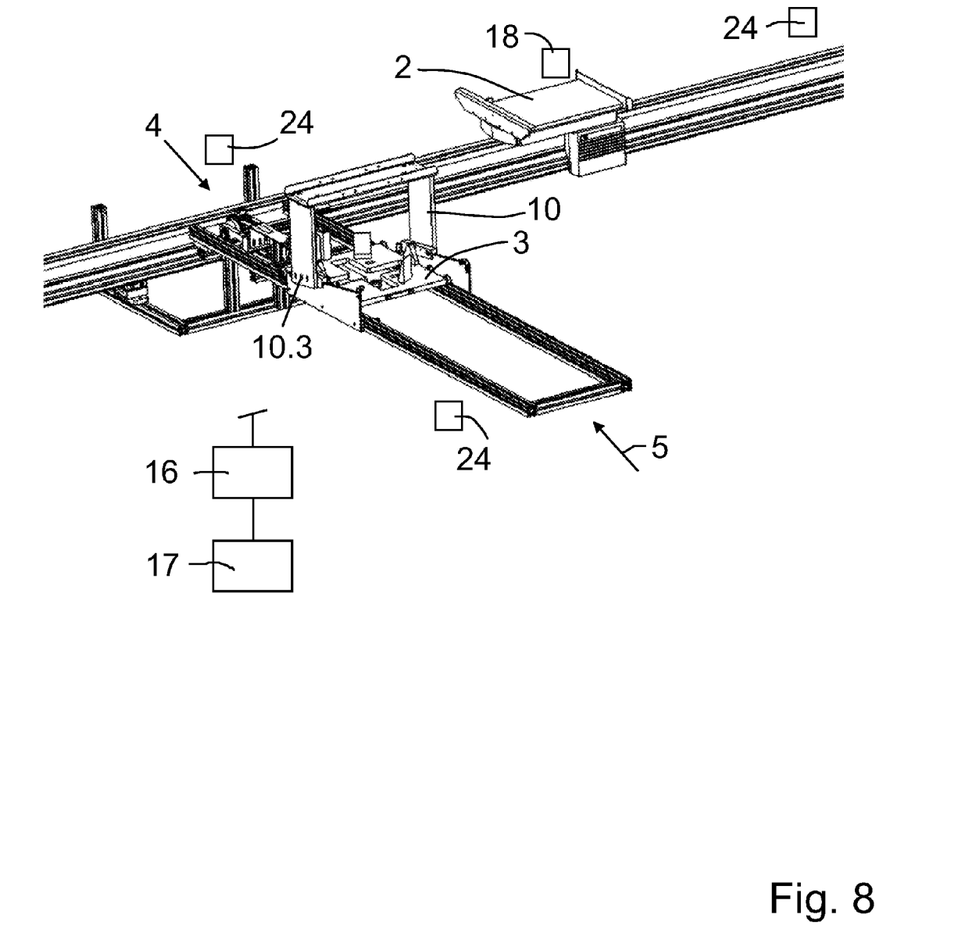
FIG. 8 a second embodiment of the modular delivery system according to the invention with a portal in a first position.

FIG. 8 shows a second embodiment of the modular delivery system according to the invention with portal 10. The delivery table 3 is located beneath the portal 10, and the portal 10 is at the first position 10.2. The trolley 2 is moved out of the delivery position 4 without delivery table 3. Due to the action of the first switching element 9.2 and second switching element 9.3, the long arms 9.12 (not all of which are shown) of the Maltese cross 9.1 are vertically oriented. The trolley 2 carries an inductively excitable passive transmitter as locator element 18 with a unique code for individual identification of the trolley 2. By means of reading devices 24 (shown only very schematically and by way of example) which are associated with the modular delivery system, it is possible to determine the location of the locator element 18 in a permanent or point-by-point manner depending on the selected operating mode and construction of the reading devices 24.

A control 16 is associated with the modular delivery system for controlling all existing drives, for monitoring and influencing the speed thereof, and for detecting data pertaining to the location of the locator elements 18. The control 16 is signal-connected to a database 17 in which constantly updatable information pertaining to the samples, the actual locations of the locator elements 18, the manipulation of the samples that has taken place (e.g., removal, treatment, insertion, transposition, etc.) and to the current availability and future desired availability of the samples is stored in a retrievable manner.

Figure 9:
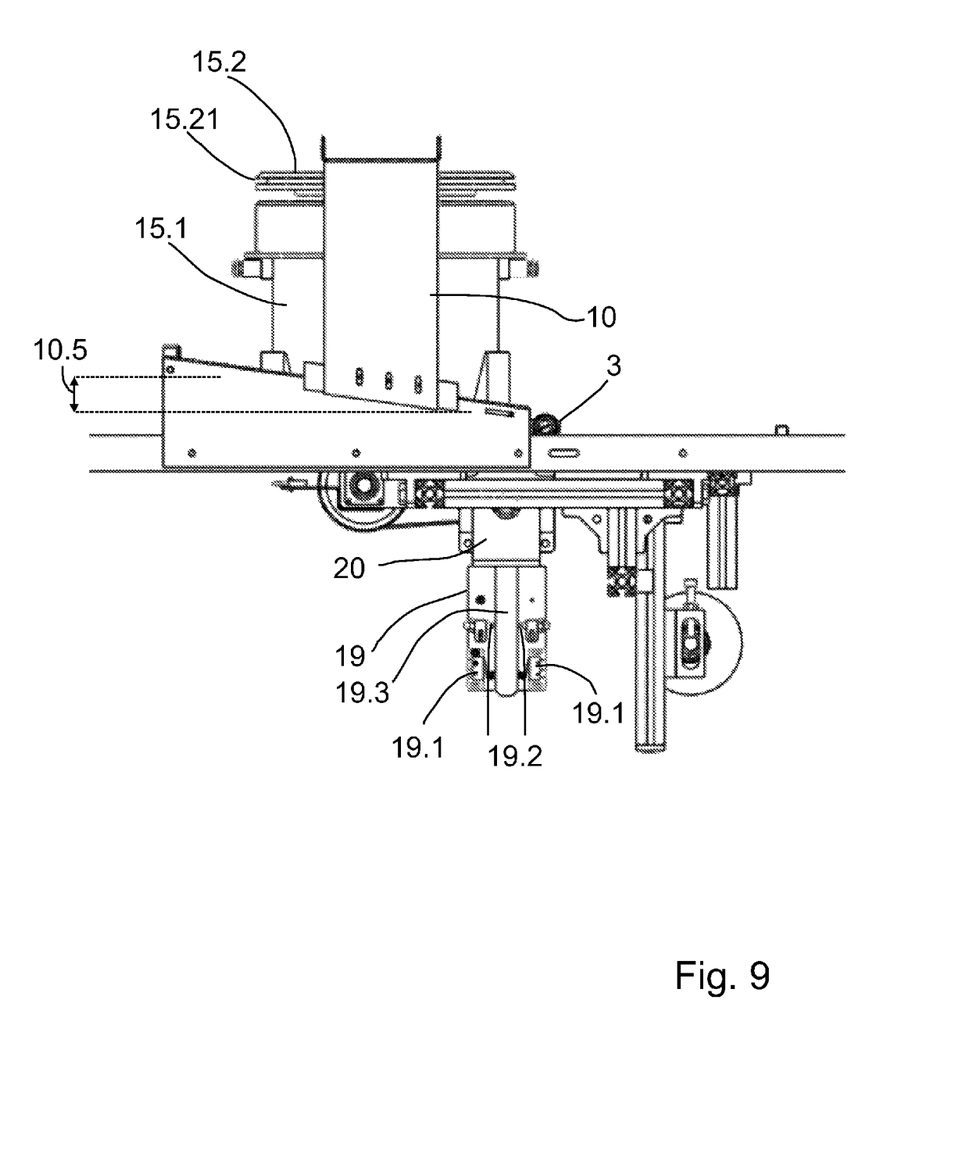
FIG. 9 a first embodiment of a torque sensor.

As is shown in FIG. 9, an embodiment of a torque sensor 19 can be configured as a rotatably mounted element. An electric motor, as drive 20 of transporting belt 8 (not shown), is bearing-mounted in such a way that it is rotated in the opposite direction when a determined threshold of the torque acting on the bearing of the drive 20 is exceeded. A threshold can be exceeded as the result of a condition that is intended under operating conditions, for example, the delivery table 3 being pressed against a fixed stop, or in case of a technical defect, e.g. during an experiment, an unlocked delivery table 3 being displaced onto the delivery path 6.1, or a cam 13 jamming in the slotted link 14. A switch 19.1 of the torque sensor 19 is actuated by the rotation of drive 20 so that the supply of energy to the drive 20 is interrupted and an error message is sent to the control 16. A switching blade 19.3 is held by pre-loaded springs 19.2 in an initial position (shown). When a force which is exerted on the switching blade 19.3 by the springs 19.2 is overcome, the switching blade 19.3 is deflected out of the initial position and one of the switches 19.1 is actuated. In further embodiments of the torque sensor 19, other quantities of switches 19.1, springs, 19.2 and switching blades 19.3 can also be provided and other switching principles implemented.

FIG. 9 further illustrates a lid 15.2 being lifted off a receptacle 15.1. The portal 10 is located over one half of the expanse 10.4 (see, e.g., FIG. 6). At the first position 10.2, the lifting elements 12 entered into a horizontally circumferential channel 15.2 of the lid 15.2. During the displacement of the delivery table 3 with the receptacle 15.2, the portal 10, and the lid 15.2 along with it, was raised by one half the height range 10.5. When the second position 10.3 has been reached (see, e.g., FIG. 6), the lid 15.2 has not only been completely lifted, but has also been raised above the receptacle 15.1 by a defined distance.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

LIST OF REFERENCE NUMERALS

1 guide rail
2 trolley
3 delivery table
3.1 first stop
3.2 second stop
3.3 movement element
3.4 edge
4 delivery position
5 end position
6 delivery station
6.1 delivery path 7 delivery direction
8 transporting belt
8.1 driver
9 locking element
9.1 Maltese cross
9.11 slot
9.12 long arm
9.13 short arm
9.14 projecting length
9.2 first switching element
9.3 second switching element
10 portal
10.1 sliding block
10.2 first position
10.3 second position
10.4 expanse
10.5 height range
11 inclined plane
12 lifting element
13 cam
14 slotted link
14.1 first member
14.2 second member
14.3 groove
15 object
15.1 receptacle
15.11 fin
15.2 lid
15.21 circumferential channel
16 control
17 database
18 locator element
19 torque sensor
19.1 switch (of the torque sensor)
19.2 spring
19.3 switching blade
20 drive (of the transporting belt)
21 guide
22 gap
23 blocking device
24 reading device
25 column
M center of mass

What is claimed is:

1. A modular delivery system including a guide rail with which is associated at least one delivery station for delivering an object to an end position, and a trolley which is movable along the guide rail for transporting an object, a delivery position of the trolley being determined by each associated delivery station, and the trolley being repeatedly deliverable to at least one of the delivery positions, wherein the trolley has a delivery table which is horizontally placeable on and removable from the trolley, the delivery table is transferable from each delivery position to the associated end position and from each end position to the associated delivery position, the trolley has a locking element for locking the delivery table to the trolley, the locking element being a Maltese cross which is rotatable around its center axis and having four opposed arms and four opposed slots, two opposed arms being formed so as to extend beyond the other opposed arms by a projecting length in radial direction, and the delivery station has at least two switching elements for switching the Maltese cross, a first switching element being formed as a pin which is arranged so as to engage in one of the four opposed slots of the Maltese cross in each instance, and a second switching element being formed as an element against which one of the projecting lengths can move during a traveling movement of the trolley so as to cause a rotation of the Maltese cross by one quarter of a revolution.

2. The modular delivery system of claim 1, wherein the delivery station has at least one delivery path for guiding the delivery table, a transporting belt drivable in a controlled manner and having at least one driver for displacing the delivery table along the at least one delivery path, and wherein at least one of the drivers is movable against a first stop of the delivery table and at least one driver is movable against a second stop of the delivery table, and the delivery station has a region forming the end position.

3. The modular delivery system of claim 2, wherein an arrangement of a first switching element and a second switching element is followed by a further second switching element and a further first switching element so that a delivery table located on the trolley is in unlocked condition when reaching the delivery position and is in locked condition after exiting the delivery position and after passing the arrangement of switching elements.

4. The modular delivery system of claim 3, wherein the delivery table has movement elements which are arranged in such a way that during delivery of the delivery table from a trolley located at the delivery position to the end position a gap present between the trolley and the delivery path has already been crossed by at least one of the movement elements before a center of mass of the delivery table arrives over the gap.

5. The modular delivery system of claim 2, wherein the delivery table has movement elements which are arranged in such a way that during delivery of the delivery table from a trolley located at the delivery position to the end position a gap present between the trolley and the delivery path has already been crossed by at least one of the movement elements before a center of mass of the delivery table arrives over the gap.

6. The modular delivery system of claim 1, wherein an arrangement of a first switching element and a second switching element is followed by a further second switching element and a further first switching element so that a delivery table located on the trolley is in unlocked condition when reaching the delivery position and is in locked condition after exiting the delivery position and after passing the arrangement of switching elements.

7. The modular delivery system of claim 6, wherein the delivery table has movement elements which are arranged in such a way that during delivery of the delivery table from a trolley located at the delivery position to the end position a gap present between the trolley and the delivery path has already been crossed by at least one of the movement elements before a center of mass of the delivery table arrives over the gap.

8. The modular delivery system of claim 1, wherein the delivery table has movement elements which are arranged in such a way that during delivery of the delivery table from a trolley located at the delivery position to the end position a gap present between the trolley and the delivery path has already been crossed by at least one of the movement elements before a center of mass of the delivery table arrives over the gap.

9. The modular delivery system of claim 1, wherein the delivery path is spanned by a portal beneath which the delivery table is guidable through, and the portal is displaceable along an expanse in delivery direction and is simultaneously vertically adjustable.

10. The modular delivery system according to claim 9, wherein the portal is positively guided along the expanse by the delivery table.

11. The modular delivery system of claim 10, wherein the delivery table has at least one cam, and the portal has at least one slotted link, wherein the cam and slotted link are configured and arranged in such a way that the cam engages in the slotted link at the start of the expanse and exits the slotted link at the end of the expanse.

12. The modular delivery system of claim 11, wherein at least one lifting element is provided at the portal for uncovering a receptacle which is transported on the delivery table and which is provided with a lid.

13. The modular delivery system of claim 10, wherein at least one lifting element is provided at the portal for uncovering a receptacle which is transported on the delivery table and which is provided with a lid.

14. The modular delivery system of claim 9, wherein at least one lifting element is provided at the portal for uncovering a receptacle which is transported on the delivery table and which is provided with a lid.

15. The modular delivery system of claim 1, wherein a drive has a torque sensor which is formed by an element which is mounted so as to be rotatable when a torque threshold is exceeded.

16. The modular delivery system of claim 1, wherein a control is provided, by which the trolley and the delivery station are controlled.

17. The modular delivery system of claim 16, wherein each trolley and/or each delivery table has a locator element allowing a location of the trolley and/or delivery table to be determined.

18. The modular delivery system of claim 17, wherein the control is signal-connected to a database.

19. The modular delivery system of claim 16, wherein the control is signal-connected to a database.

* * * * *